(12) United States Patent
Zhong et al.

(10) Patent No.: US 6,980,599 B2
(45) Date of Patent: Dec. 27, 2005

(54) VIDEO DECODING SYSTEM AND METHOD HAVING POST-PROCESSING TO REDUCE SHARPNESS PREDICTION DRIFT

(75) Inventors: Zhun Zhong, Croton-on-Hudson, NY (US); Yingwei Chen, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 426 days.

(21) Appl. No.: 10/161,795

(22) Filed: Jun. 4, 2002

(65) Prior Publication Data

US 2003/0223501 A1  Dec. 4, 2003

(51) Int. Cl.[7] ............................................... H04B 1/66
(52) U.S. Cl. ............................................... 375/240.29
(58) Field of Search ............... 375/240.09, 240.01, 375/240.29, 240.11, 240.02; 348/425.2; H04B 1/66

(56) References Cited

U.S. PATENT DOCUMENTS

| | | | |
|---|---|---|---|
| 4,941,043 A | 7/1990 | Jass | 358/133 |
| 5,134,476 A | 7/1992 | Aravind et al. | 358/133 |
| 5,253,059 A | 10/1993 | Ansari et al. | 358/138 |
| 5,384,849 A * | 1/1995 | Jeong | 348/425.2 |
| 5,614,952 A * | 3/1997 | Boyce et al. | 375/240.01 |
| 5,798,795 A * | 8/1998 | Glenn et al. | 375/240.11 |
| 5,852,475 A * | 12/1998 | Gupta et al. | 348/606 |
| 6,028,632 A * | 2/2000 | Siong et al. | 375/240.01 |
| 6,178,205 B1 | 1/2001 | Cheung et al. | 375/240 |
| 6,184,935 B1 | 2/2001 | Iaquinto et al. | 348/441 |
| 6,233,277 B1 * | 5/2001 | Ozcelik et al. | 375/240.02 |
| 6,272,177 B1 | 8/2001 | Murakami et al. | 375/240 |

FOREIGN PATENT DOCUMENTS

EP  0707426  4/1996  ............ H04N 7/26

OTHER PUBLICATIONS

"Lw-cost All Format ATV Decoding with Improved Quality" by Boyce et al, Feb. 2, 1996, pp. 45-51, XP-001006067.

* cited by examiner

*Primary Examiner*—Tung Vo

(57) ABSTRACT

A video processing system comprising: a decoder having a complexity reduction system; and a post-processing system for processing an output of the decoder, wherein the post-processing system includes a filter for intentionally blurring a set of frames in a group of pictures (GOP) to achieve a smooth visual transition between frames.

11 Claims, 3 Drawing Sheets

VIDEO DECODING SYSTEM AND METHOD HAVING POST-PROCESSING TO REDUCE SHARPNESS PREDICTION DRIFT

BACKGROUND OF THE INVENTION

1. Technical Field

The present invention relates generally to video decoders having complexity reduction systems, and more particularly to a post processing system and method for reducing the pulsing of video sharpness caused by complexity reduction.

2. Related Art

As the demand for feature-rich video processing applications continues to increase, the need to manage computational resources associated with such applications has become an ongoing challenge. One example of a system that manages video resources is a reduced complexity decoding system. In such a system, the decoder complexity can be reduced significantly using in-loop processing techniques. For instance, well-designed discrete cosine transform (DCT) masking can simplify the inverse DCT (IDCT) process, delivering gracefully degraded video quality and reducing decoding complexity.

In addition, embedded resizing, a scheme that incorporates the scaling function within the decoding loop, achieves complexity and memory savings from reduced resolution IDCT and motion compensation. Present complexity reduction systems can reduce CPU cycles by 30 percent while delivering satisfactory video quality for most normal scene sequences.

As is known, the trade-off for complexity reduction is an introduction of decoder errors into the decoding loop. Specifically, errors will propagate via motion compensation until the next Intra-coded or "I" frame. As a result, the video quality usually degrades progressively within a Group of Pictures (GOP), resulting in a prediction drift.

Since the most common degradation is loss of sharpness, typical prediction drift is seen by a viewer as a pulsing of video sharpness, i.e., the periodic occurrence of some gradually burring pictures followed by a sharp picture. Although some techniques help to reduce the prediction drift, such as frame-type-dependent processing which provides protection to those pictures contributing to predictions, the techniques cannot eliminate the drift problem. As long as there are errors in the prediction path, there will be prediction drift.

Accordingly, improved techniques are required to better address prediction drift in complexity reduced decoding systems.

SUMMARY OF THE INVENTION

The present invention addresses the above-mentioned problems, as well as others, by providing a post-processing system and method for complexity reduced decoders that intentionally blur pictures in a video sequence to achieve a smooth quality transition from frame to frame. In a first aspect, the invention provides a video processing system comprising: a decoder having a complexity reduction system; and a post-processing system for processing an output of the decoder, wherein the post-processing system includes a filter for intentionally blurring a set of frames in a group of pictures (GOP) to achieve a smooth visual transition between frames.

In a second aspect, the invention provides a method for eliminating prediction drift in a complexity reduced video sequence, the method comprising: determining an amount of post-processing resources available; determining a number of frames in the video sequence that can be processed pursuant to the available resources; selecting a set of frames within the video sequence to process; and filtering the set of selected frames, wherein the filtering blurs the set of frames in order to achieve a smooth visual transition between frames.

In a third aspect, the invention provides a post-processing system for eliminating prediction drift in a complexity reduced video sequence, comprising: a controller for receiving an available amount of post-processing resources and determining a number of frames in the video sequence that can be processed pursuant to the available resources; a frame selector for selecting a set of frames within the video sequence to process; and a filter for filtering the set of frames, wherein the filtering blurs the set of frames in order to achieve a smooth visual transition between frames.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
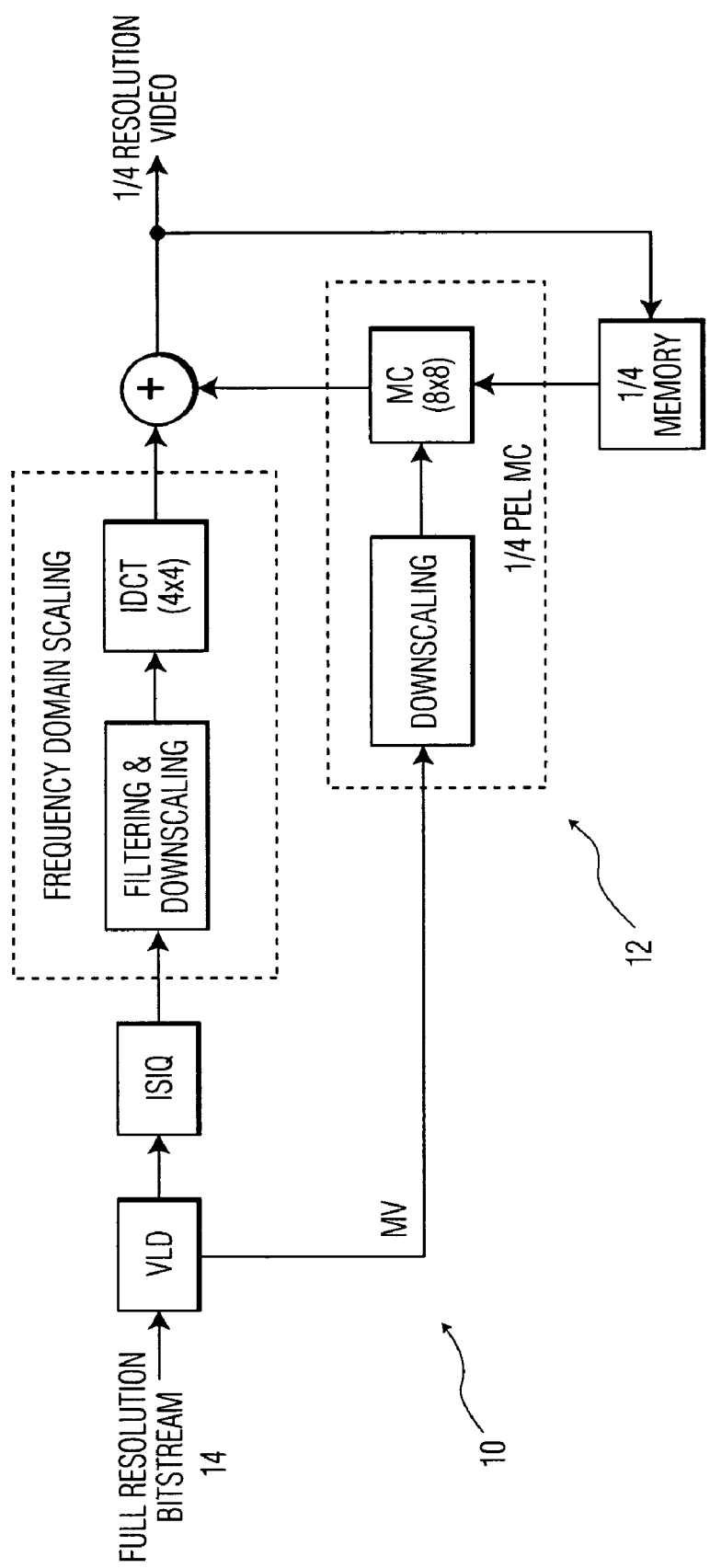
FIG. 1 depicts a complexity scalable decoder system in accordance with the present invention.

Referring now to the drawings, FIG. 1 depicts an MPEG decoding system 10 capable of providing complexity reduction. Namely, decoding system 10 comprises an embedded resizing system 12 that can reduce the computational complexity required for decoding the input bitstream 14. It should be understood that decoding system 10 is shown for exemplary purposes only, and other types of DCT/motion estimation based decoding systems (e.g., H.26x family decoders) and/or complexity reduction systems (e.g., graceful degradation systems) could be utilized.

As noted above, it is known that the trade-off for complexity reduction is an introduction of decoder errors into the decoding loop that result in a prediction drift. The present invention addresses this problem, not by trying to prevent the occurrence of prediction drift, but rather, by providing a post-processing system that makes sequences decoded with prediction drift look subjectively better to the viewer.

Since the Human Visual System is sensitive to abrupt changes of video quality between consecutive frames, often it is the contrast between a blurred picture and a subsequent sharp picture that results in a greater visual annoyance than the blurred picture itself. The present invention addresses this by intentionally blurring one or more sharp pictures immediately following a blurred picture to achieve a smooth quality transition from frame to frame and GOP to GOP.

Figure 2:
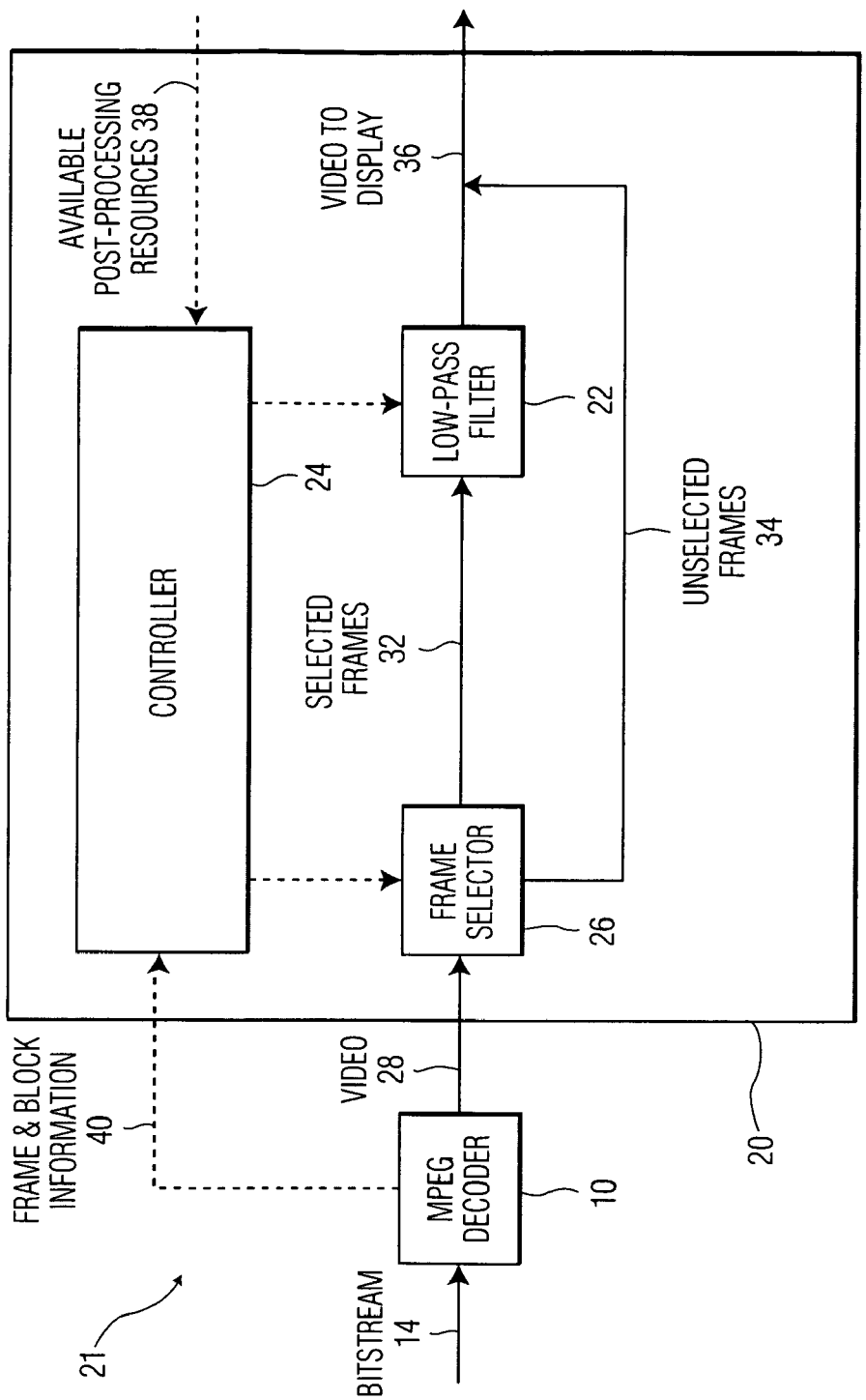
FIG. 2 depicts an MPEG decoding system having a post-processing system in accordance with the present invention.

Referring to FIG. 2, a video processing system 21 is shown having an MPEG decoder 10 and post-processing system 20. Post-processing system 20 includes: a controller 24 that receives frame and block information 40 from MPEG decoder 10 and available post-processing resource 38; a frame selector 26 that receives video 28 from MPEG decoder 10 and data from controller 24; and a low-pass filter 22 that receives a set of selected frames 32 from frame selector 26 and data from controller 24. The output of post-processing system 20 is a video sequence for display 36 that includes selected frames 32 that are filtered and unselected frames 34 that are not filtered by low-pass filter 22. Low-pass filter 22 eliminates high frequency elements from a picture to intentionally blur the picture.

Controller 24 has two primary functions. First, because post-processing system 20 requires computational resources, controller 24 is responsible for maintaining the computational complexity of post-processing system 20 within an allotted resource budget. Namely, controller 24 must determine how many frames can be processed in a given time interval without exceeding an available amount of post-processing resources 38. One exemplary method for achieving this is as follows. Assuming the filtering complexity of low-pass filter 22 is directly proportional to picture size "p" and filter length "f," controller 24 can calculate the number of frames N it can process within a resource budget "r" according the following equation: N=r/(p·f·k), where k is a constant representing the computational resources needed per pixel per filter coefficient. Accordingly, (p·f·k) represents the average complexity required to filter one frame.

Thus, for example, if the available resources were 1 million cycles per second, the picture size was 10,000 pixels, the filter length was four, and k was selected as one, then the system could process 25 frames per second. Once calculated, controller 24 can pass this information to frame selector 26 and/or low-pass filter 22.

In addition to determining a number of frames N to process, controller 24 must also determine a cut-off frequency for the low-pass filter 22. The cut-off frequency should be selected low enough to blur the sharp pictures, but high enough not to blur pictures that were already blurred by the decoding process. In one exemplary embodiment, the cut-off frequency is selected as follows.

It is recognized that in MPEG decoding with embedded resizing that a major source of sharpness loss is the interpolation from the reduced-resolution reference frame. The sharper the reference image is, the bigger sharpness loss the interpolation suffers. In addition, the more reference frames in a GOP, the larger the accumulated sharpness loss at the end of the GOP. Accordingly, the desired cut-off frequency C can be estimated as: $C=C_0-(S \cdot N_r)$, where $C_0$ is a constant, S measures the sharpness of a first I frame in the GOP, and $N_r$ is the number of reference frames in the GOP. Thus, as the sharpness of the first I frame and/or number of reference frames increases, the lower the cut-off frequency becomes.

In order to implement the above formula, a system for measuring sharpness for the initial I frame may be provided. In one exemplary embodiment, the sharpness may be measured by examining the non-zero coefficients of a DCT block. For instance, sharpness "S" may comprise the average length and width of the largest "non-zero rectangle" that covers the non-zero coefficients of a DCT block. This implementation is described in greater detail with regard to FIG. 3.

Figure 3:
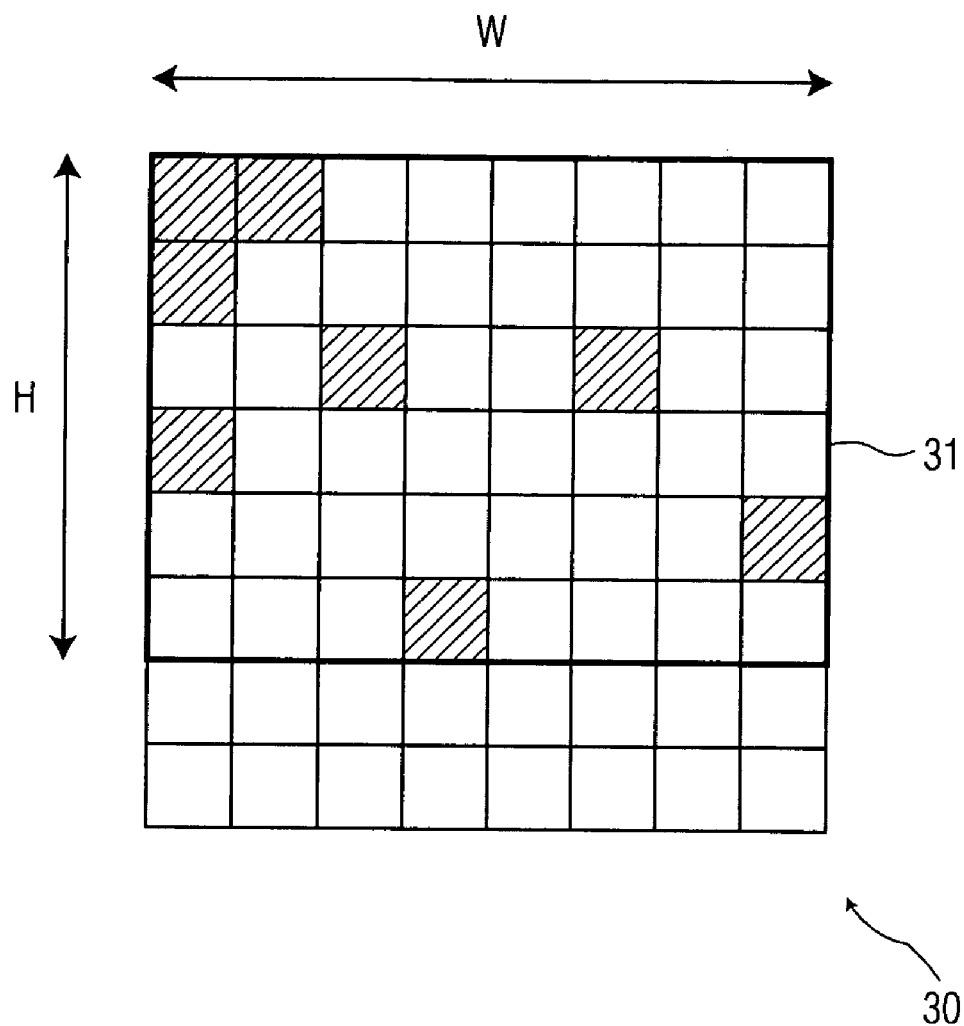
FIG. 3 depicts a frame sharpness scheme in accordance with the present invention.

FIG. 3 depicts an exemplary 8×8 DCT block 30 that includes zero (white) and non-zero (black) coefficients. The tightest rectangle that can cover each of the non-zero coefficients is a 6×8 rectangle 31 (shown in bold), i.e., width W=8 and height H=6. Assume there are 1000 such DCT blocks in the frame, resulting in 1000 "W" values and 1000 "H" values (one W and one H value from each block). The average of the 1000 W values (i.e., W') and 1000 H values (i.e., H') can then be separately calculated resulting in an average non-zero rectangle for the frame (e.g., W'=7.32×H'=6.04). The average non-zero rectangle can then be used to measure the sharpness of the frame. Thus, for a given frame, a cutoff frequency for each direction (i.e., horizontal, using W', and vertical, using H') is available to be used to measure sharpness. Similarly, in the filter design stage, one filter is designed for horizontal filtering, using the horizontal cutoff frequency, and one filter is designed for vertical filtering, using vertical cutoff frequency.

Note that for MPEG decoding involving embedded resizing, the DCT blocks would be of a reduced resolution (e.g., 4×4). In the resizing case, the sharpness S would comprise the average non-zero rectangle within the reduced resolution DCT blocks.

Frame selector 26 selects the N frames that need to be blurred. Since the picture sharpness usually decreases towards the end of the GOP, frame selector 26 can be designed to select the first N frames within a GOP. The selected frames are sent to low-pass filter 22, which blurs the frames and forwards the blurred frames to the display 36. Those frames that are not selected (i.e., the unselected frames 34) bypass the low-pass filter 22 and are displayed without filtering.

Low-pass filter 22 can be implemented in any known manner. For instance, given a desired cutoff frequency C, low-pass filter 22 can either be dynamically generated or obtained from a pre-calculated look-up table. Known filter design methods, such as cubic spline and Kaiser window design, could be used to generate the filter coefficients. The low-pass filtering operation could be carried out in a hardware co-processor that includes a general media purpose media processor. If such a co-processor is not available, filtering can be implemented by the CPU core of the media processor.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

What is claimed is:

1. A video processing system comprising:
a decoder having a complexity reduction system; and a post-processing system for processing an output of the decoder, wherein the post-processing system includes a filter for intentionally blurring a set of frames in a group of pictures (GOP) to achieve a smooth visual transition between frames, wherein the post-processing system further includes a controller for maintaining a complexity of the post-processing system within a resource budget and for calculating a cut-off frequency of the filter; and a frame selector for selecting the set of frames in the GOP to be blurred by the filter,
wherein the controller calculates a number of frames N it is capable of processing for a given resource constraint r according to the equation:
$N=r/(p \cdot f \cdot k)$, wherein p is a picture size, f is the filter length, and k is a constant representing a computational resource needed per pixel per filter coefficient.

2. The video processing system of claim 1, wherein the set of frames selected by the frame selector to be blurred comprises the first N frames in the GOP.

3. A video processing system comprising:
a decoder having a complexity reduction system; and a post-processing system for processing an output of the decoder, wherein the post-processing system includes a filter for intentionally blurring a set of frames in a group of pictures (GOP) to achieve a smooth visual transition between frames, wherein the post-processing system further includes a controller for maintaining a complexity of the post-processing system within a resource budget and for calculating a cut-off frequency of the filter; and a frame selector for selecting the set of frames in the GOP to be blurred by the filter,
wherein the controller estimates the cut-off frequency C using the equation $C=C_0-(S \cdot N_r)$, wherein $C_0$ is a constant, S measures the sharpness of a first I frame in the GOP, and $N_r$ is the number of reference frames in the GOP.

4. A method for eliminating prediction drift in a complexity reduced video sequence, the method comprising:
determining an amount of post-processing resources available;
determining a number of frames in the video sequence that can be processed pursuant to the available resources;
selecting a set of frames within the video sequence to process;
filtering the set of selected frame, wherein the filtering blurs the set of frames in order to achieve a smooth visual transition between frames; and
calculating a cut-off frequency of the filter for the video sequence prior to the filtering operation,
wherein the cut-off frequency C is calculated using the equation: $C=C_0-(S \cdot N_r)$, wherein $C_0$ is a constant, S measures the sharpness of a first I frame in the GOP, and $N_r$ is the number of reference frames in the GOP.

5. The method of claim 4, wherein the sharpness S is calculated based on the arrangement of non-zero discrete cosine transform (DCT) coefficients in each of a plurality of DCT blocks of the first I frame in the GOP.

6. A method for eliminating prediction drift in a complexity reduced video sequence, the method comprising:
determining an amount of post-processing resources available;
determining a number of frames in the video sequence that can be processed pursuant to the available resources;
selecting a set of frames within the video sequence to process; and filtering the set of selected frame, wherein the filtering blurs the set of frames in order to achieve a smooth visual transition between frames, wherein the number of video frames N that can be processed under a given resource constraint r is calculated according to the equation:
$N=r/(p \cdot f \cdot k)$, wherein p is a picture size, f is a filter length, and k is a constant representing a computational resource needed per pixel per filter coefficient.

7. The method of claim 6, wherein the set of frames selected to be blurred comprises the first N frames in the video sequence.

8. A post-processing system for eliminating prediction drift in a complexity reduced video sequence, comprising:
a controller for receiving an available amount of post-processing resources and determining a number of frames in the video sequence that can be processed pursuant to the available resources;
a frame selector for selecting a set of frames within the video sequence to process; and
a filter for filtering the set of frames, wherein the filtering blurs the set of frames in order to achieve a smooth visual transition between frames, wherein the controller calculates a cut-off frequency of the filter for the video sequence,
wherein the cut-off frequency C is calculated using the equation: $C=C_0-(S \cdot N_r)$, wherein $C_0$ is a constant, S measures the sharpness of a first I frame in the GOP, and $N_r$ is the number of reference frames in the GOP.

9. The post-processing system of claim 8, wherein the sharpness S is calculated based on the arrangement of non-zero discrete cosine transform (DCT) coefficients in each of a plurality of DCT blocks of the first I frame in the GOP.

10. A post-processing system for eliminating prediction drift in a complexity reduced video sequence, comprising:
a controller for receiving an available amount of post-processing resources and determining a number of frames in the video sequence that can be processed pursuant to the available resources;
a frame selector for selecting a set of frames within the video sequence to process; and
a filter for filtering the set of frames, wherein the filtering blurs the set of frames in order to achieve a smooth visual transition between frames, wherein controller calculates the number of video frames N that can be processed under a given resource constraint r according to the equation: $N=r/(p \cdot f \cdot k)$, wherein p is a picture size, f is a filter length, and k is a constant representing a computational resource needed per pixel per filter coefficient.

11. The post-processing system of claim 10, wherein set of frames selected to be blurred by the frame selector comprises the first N frames in the video sequence.

* * * * *